(12) United States Patent
Lee (10) Patent No.: US 12,060,949 B2
(45) Date of Patent: Aug. 13, 2024

(54) ASSEMBLABLE CHECK VALVE

(71) Applicant: DO QOOM, CORP, LTD, Gwangju (KR)

(72) Inventor: Sang Heon Lee, Seoul (KR)

(73) Assignee: Do Qoom, Corp, Ltd, Gwangju (KR)

( * ) Notice: Subject to any disclaimer, the term of this patent is extended or adjusted under 35 U.S.C. 154(b) by 181 days.

(21) Appl. No.: 17/623,002

(22) PCT Filed: Jun. 23, 2020

(86) PCT No.: PCT/KR2020/008164
§ 371 (c)(1),
(2) Date: Dec. 27, 2021

(87) PCT Pub. No.: WO2020/262936
PCT Pub. Date: Dec. 30, 2020

(65) Prior Publication Data
US 2022/0228670 A1    Jul. 21, 2022

(30) Foreign Application Priority Data

Jun. 28, 2019 (KR) .................. 10-2019-0077818

(51) Int. Cl.
*F16K 15/06* (2006.01)
*F16K 15/02* (2006.01)
(Continued)

(52) U.S. Cl.
CPC ........ *F16K 27/0209* (2013.01); *F16K 15/023* (2013.01); *F16K 15/063* (2013.01); *F16K 31/50* (2013.01)

(58) Field of Classification Search
CPC .... F16K 27/0209; F16K 31/50; F16K 31/508; F16K 15/023; F16K 15/063; F16K 15/03; (Continued)

(56) References Cited

U.S. PATENT DOCUMENTS

| | | | | |
|---|---|---|---|---|
| 2,002,451 A | * | 5/1935 | Gray | F16L 55/055 251/51 |
| 2,214,000 A | * | 9/1940 | Sifkovitz | F16K 31/508 251/266 |

(Continued)

FOREIGN PATENT DOCUMENTS

| | | |
|---|---|---|
| CN | 204647452 U | 9/2015 |
| CN | 104976390 A | 10/2015 |

(Continued)

OTHER PUBLICATIONS

International Search Report (KR) for PCT Application No. PCT/KR2020/008164, dated received on Sep. 29, 2020 in 5 pages.

(Continued)

*Primary Examiner* — Craig J Price
(74) *Attorney, Agent, or Firm* — Knobbe, Martens, Olson & Bear, LLP (57) ABSTRACT

A check valve is provided between an inflow pipe and a discharge pipe through which fluid is transferred. The check valve includes a body part having an inflow region connected to the inflow pipe so that the fluid flows therein, a retention region in which the fluid supplied therein through the inflow region remains, and a discharge region connected to the discharge pipe so that the fluid of the retention region is discharged to the outside therethrough; and an opening/closing part, which is provided inside the body part so as to have a disc assembly for opening/closing the path of the fluid flowing in through the inflow pipe, a stem for providing the movement path of the disc assembly, and a first guide for supporting one side of the stem.

9 Claims, 9 Drawing Sheets

(51) Int. Cl.
*F16K 27/02* (2006.01)
*F16K 31/50* (2006.01)

(58) Field of Classification Search
CPC ...... F16K 15/18; F16K 15/182; F16K 15/184; F16K 15/028; F16K 15/025; F16K 15/06; F16K 1/42; Y10T 137/7738; Y10T 137/7743; Y10T 137/7939; F16L 55/055
USPC .............. 137/456–478, 528–543.23, 315.35; 251/264–278, 83
See application file for complete search history.

(56) References Cited

U.S. PATENT DOCUMENTS

| | | | | |
|---|---|---|---|---|
| 2,426,423 | A * | 8/1947 | Woolsey | F16L 17/04 403/222 |
| 2,619,115 | A | 11/1952 | Dondero et al. | |
| 2,643,849 | A * | 6/1953 | Davis | F22B 37/545 251/222 |
| 2,731,035 | A * | 1/1956 | Stevenson | F16K 17/048 137/512.1 |
| 3,035,604 | A * | 5/1962 | Portis | F16K 17/0466 251/332 |
| 4,634,093 | A * | 1/1987 | Schintgen | F16K 1/482 251/273 |
| 4,799,506 | A * | 1/1989 | Taylor | F16K 17/06 137/542 |
| 4,945,941 | A * | 8/1990 | Kocher | F16K 15/18 251/364 |
| 6,443,182 | B1 * | 9/2002 | Hathcock | F16K 15/063 137/514.5 |
| 6,516,828 | B2 * | 2/2003 | Choate | F16K 17/04 251/118 |
| 10,612,676 | B2 * | 4/2020 | Lee | F16K 39/024 |
| 11,143,323 | B2 * | 10/2021 | Lee | F16K 15/028 |
| 11,268,638 | B2 * | 3/2022 | McNamara | F16K 15/00 |
| 2005/0062000 | A1 | 3/2005 | Bartell, Jr. et al. | |
| 2016/0290521 | A1 | 10/2016 | Strotkoetter | |

FOREIGN PATENT DOCUMENTS

| | | |
|---|---|---|
| JP | S51-119518 A | 10/1976 |
| JP | S52-149302 U | 11/1977 |
| JP | S58-149659 U | 10/1983 |
| JP | S58-189863 U | 12/1983 |
| JP | S60-008574 U | 1/1985 |
| JP | H11-022842 A | 1/1999 |
| JP | 2000-516327 A | 12/2000 |
| JP | 2001-141085 A | 5/2001 |
| JP | 2006-300276 A | 11/2006 |
| JP | 2019-507300 A | 3/2019 |
| JP | 2019-517646 A | 6/2019 |
| KR | 10-2000-0029438 A | 5/2000 |
| KR | 20-0290295 Y1 | 9/2002 |
| KR | 200290295 Y1 * | 9/2002 |
| KR | 10-1096870 B1 | 12/2011 |
| KR | 10-1216035 B1 | 12/2012 |
| KR | 10-2017-0135766 A | 12/2017 |
| WO | WO-2017123028 A1 * | 7/2017 ............. F16K 15/02 |
| WO | WO-2017209515 A1 * | 12/2017 ............. B21C 37/08 |

OTHER PUBLICATIONS

Office Action in corresponding Japanese Application No. 2021-577979 dated Feb. 14, 2023.
Office Action in Chinese Application No. 202080045947.8 dated Dec. 1, 2023 in 11 pages.
Office Action in Japanese Application No. 2021-577979 dated Sep. 5, 2023 in 4 pages.

* cited by examiner

ASSEMBLABLE CHECK VALVE

TECHNICAL FIELD

The present invention relates to a check valve, and more particularly, to a check valve in which a cap provided in a body part of a check valve and an opening/closing part for opening or closing the inside of the body part may be configured as a separated type and may be assembled separately, which may stably support a disc assembly that opens or closes a path of a fluid and at the same time, to increase the flow rate of the fluid being introduced, and which may prevent corrosion of a disc sheet even when a flow path is repeatedly opened or closed.

BACKGROUND ART

In general, a valve refers to a device that controls a flow rate, a flow velocity, a pressure, or the like of a fluid flowing in a pipe. Types of the valve include a pressure valve, a shielding valve, a flow rate control valve, a water flow valve, and a control valve as well as a check valve for allowing the fluid to flow in only one direction and blocking the flow in a direction opposite to the one direction.

A valve according to the related art includes a valve body and an opening/closing part that blocks or opens a path of a fluid passing through the valve body. In more detail, the valve body includes an inlet part through which the fluid is introduced, a space in which the fluid supplied to the inside of the valve body through the inlet part is retained, and an outlet part through which the fluid in the space is discharged to the outside.

Further, the opening/closing part includes a stem having one side located outside the valve body and the other side located inside the valve body, a handle installed on the one side of the stem, and a disc that is connected to the other side of the stem and opens or shields the inlet part or the outlet part while linearly moving in two directions.

Such a valve body according to the related art is formed of a cast iron casting (hereinafter, referred to as cast iron), and in general, machining is difficult due to characteristics of the cast iron which is vulnerable to a temperature change or an impact, and thus a guide for supporting the above-described stem is formed integrally with a cap for opening the inside of the valve body.

However, when the cap and the guide are integrally formed as described above, the size of components is increased, and thus handling is not easy.

Further, an inlet and an outlet cannot be welded together due to the characteristics of the cast iron, which is vulnerable to the temperature change, and the inlet and the outlet cannot be connected using a ring joint manner or a groove joint manner because it is difficult to form grooves or protrusions in the valve body due to the characteristics vulnerable to an impact.

Thus, improvement therefor is required.

DISCLOSURE

Technical Tasks

The present invention is directed to providing a check valve in which a cap provided in a body part of the check valve and an opening/closing part for opening or closing an inside thereof are configured as a separated type and thus may be assembled separately.

The present invention is also directed to providing a check valve capable of stably supporting a disc assembly that opens or closes a path of a fluid.

The present invention is also directed to providing a check valve capable of increasing a flow rate of a fluid being introduced.

The present invention is also directed to providing a check valve capable of preventing corrosion of a disc sheet even when a flow path is repeatedly opened or closed.

Technical Solution

One aspect of the present invention provides a check valve installed between an inlet pipe and an outlet pipe through which a fluid flows, the check valve including a body part that has an inlet region which is connected to the inlet pipe and through which the fluid is introduced, a retention region in which the fluid supplied to an inside of the body part through the inlet region is retained, and a discharge region which is connected to the outlet pipe and through which the fluid in the retention region is discharged to an outside of the body part, and an opening/closing part that has a disc assembly which is provided inside the body part and opens or closes a path of the fluid introduced through the inlet pipe, a stem which provides a movement path of the disc assembly, and a first guide that supports one side of the stem, wherein the body part has a cap that opens the inside of the body part so that the opening/closing part is retracted or extracted, the first guide has a first coupling surface fixedly inserted into an inner circumferential surface of a through-hole formed in the cap, the disc assembly includes a disc that allows a flowing fluid to be introduced or blocked and a disc stem disposed in a center of the disc and coupled to the stem, a second guide into which the disc stem is inserted is provided on the other side of the stem, an outer circumferential surface of the disc stem slides in an axial direction while being supported by an inner circumferential surface of the second guide, an in guide that supports the other side of the disc stem is provided in an inner circumferential surface of the inlet pipe, and the in guide has a support ring through which the other side of the disc stem is supported to pass and a support bar extending radially outward from the support ring and fixed to the inner circumferential surface of the inlet pipe in a welding manner.

Another aspect of the present invention provides a check valve installed between an inlet pipe and an output pipe through which a fluid flows, the check valve including a body part that has an inlet region which is connected to the inlet pipe and through which the fluid is introduced, a retention region in which the fluid supplied to an inside of the body part through the inlet region is retained, and a discharge region which is connected to the outlet pipe and through which the fluid in the retention region is discharged to an outside, and an opening/closing part that has a disc assembly which is provided inside the body part and opens or closes a path of the fluid introduced through the inlet pipe, a stem which provides a movement path of the disc assembly, and a first guide that supports one side of the stem, wherein the body part has a cap that opens the inside of the body part so that the opening/closing part is retracted or extracted, a first coupling surface fixedly inserted into an inner circumferential surface of a through-hole formed in the cap is formed in the first guide, a stepped surface, on which a first surface extending axially and a second surface extending radially outward are formed, is formed on the inner circumferential surface of the through-hole, and a second coupling surface fixedly inserted into the stepped surface is formed on the first guide.

A first coupling groove recessed in an axial direction of the stem may be formed in one side of the first guide, and a first bush that simultaneously supports an inner circumferential surface of the first guide and an outer circumferential surface of the stem may be inserted into the first coupling groove.

A second coupling groove recessed in the axial direction of the stem may be formed in the other side of the first guide, and a second bush that simultaneously supports the inner circumferential surface of the first guide and the outer circumferential surface of the stem may be inserted into the second coupling groove.

A separation surface spaced apart from the outer circumferential surface of the stem may be formed in the second coupling groove.

Fastening grooves may be formed radially inward along circumferences in outer circumferential surfaces of the body part and the cap, and the check valve may further include a coupler having a pair of legs extending radially inward so that the legs are inserted into the pair of fastening grooves facing each other.

Still another aspect of the present invention provides a check valve installed between an inlet pipe and an outlet pipe through which a fluid flows, the check valve including a body part that has an inlet region which is connected to the inlet pipe and through which the fluid is introduced, a retention region in which the fluid supplied to an inside of the body part through the inlet region is retained, and a discharge region which is connected to the outlet pipe and through which the fluid in the retention region is discharged to an outside of the body part, and an opening/closing part that has a disc assembly which is provided inside the body part and opens or closes a path of the fluid introduced through the inlet pipe, a stem which provides a movement path of the disc assembly, and a first guide that supports one side of the stem, wherein the body part has a cap that opens the inside of the body part so that the opening/closing part is retracted or extracted, a first coupling surface fixedly inserted into an inner circumferential surface of a through-hole formed in the cap is formed in the first guide, an in plate having an inlet hole through which the fluid introduced through the inlet pipe flows is formed at an end of the inlet region, an insertion groove into which a circumference of the inlet pipe is inserted by a predetermined length in an axial direction is formed in the in plate, a reinforcement rib, which extends axially toward the disc assembly and is fixed to the circumference of the inlet hole in a hardface-welding manner using a corrosion-resistant welding rod, is provided at a circumference of the inlet hole, and a seating surface on which the disc assembly is seated is formed in the reinforcement rib, and a downward inclination is formed on the seating surface in a direction away from the disc assembly so that a contact area between the disc assembly and the seating surface increases as an elastic restoring force of a spring increases.

Locking grooves extending radially inward along circumferences of the inlet pipe and the outlet pipe may be formed in the inlet pipe and the outlet pipe.

Flanges extending radially outward along circumferences of the inlet pipe and the outlet pipe may be formed in the inlet pipe and the outlet pipe.

Fastening grooves may be formed radially inward along circumferences in an outer circumferential surface of the discharge region and an outer circumferential surface of the outlet pipe formed in the body part, and the check valve may further include a coupler having a pair of legs extending radially inward so that the legs are inserted into the pair of fastening grooves facing each other.

Advantageous Effects

In a check valve having the above configuration according to the present invention, since a cap provided in a body part and an opening/closing part for opening or closing an inside are configured as a separated type and are then separately assembled, the volume is reduced, and thus handling is easy, and workability is improved.

Further, since first and second bushes are provided in a first guide to support a disc assembly for opening or closing a path of a fluid, the disc assembly is stably supported, and thus an opening/closing operation can be reliably performed.

Further, an in guide provided in an inlet pipe to support the other side of a disc stem includes a support ring and a support bar, and thus a flow rate of a fluid being introduced can increase, and smooth flow can be achieved.

In addition, a reinforcement rib is provided at a portion on which the disc assembly is seated to close a flow path, and thus corrosion of the disc sheet can be prevented even when the flow path is repeatedly opened or closed.

DESCRIPTION OF DRAWINGS

FIGS. 2 and 3 are cross-sectional views illustrating the check valve according to the present invention, wherein

EMBODIMENTS

Hereinafter, embodiments of the present invention will be described in detail with reference to the accompanying drawings so that those skilled in the art to which the present invention pertains may easily implement the present invention. The present invention may be implemented in various different forms and is not limited to the embodiments described herein. In the drawings, parts irrelevant to the description are omitted in order to clearly describe the present invention, and the same reference numerals are assigned to the same or similar components throughout the specification.

It should be understood in the present specification that the terms "include" or "have" are intended to indicate that there are features, numbers, steps, operations, components, parts, or combinations thereof that are described in the specification and do not exclude in advance the possibility of the presence or addition of one or more other features, numbers, steps, operations, components, parts, or combinations thereof.

Figure 1:
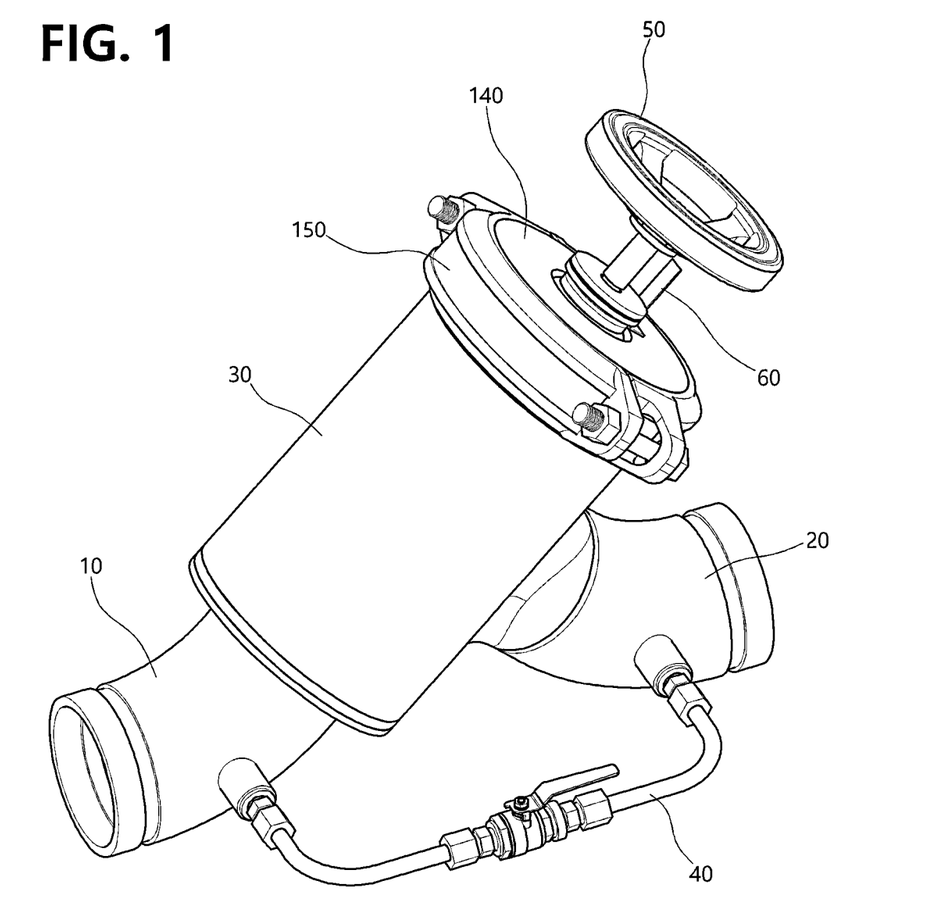
FIG. 1 is a perspective view illustrating a check valve according to an embodiment of the present invention.
Figure 2:
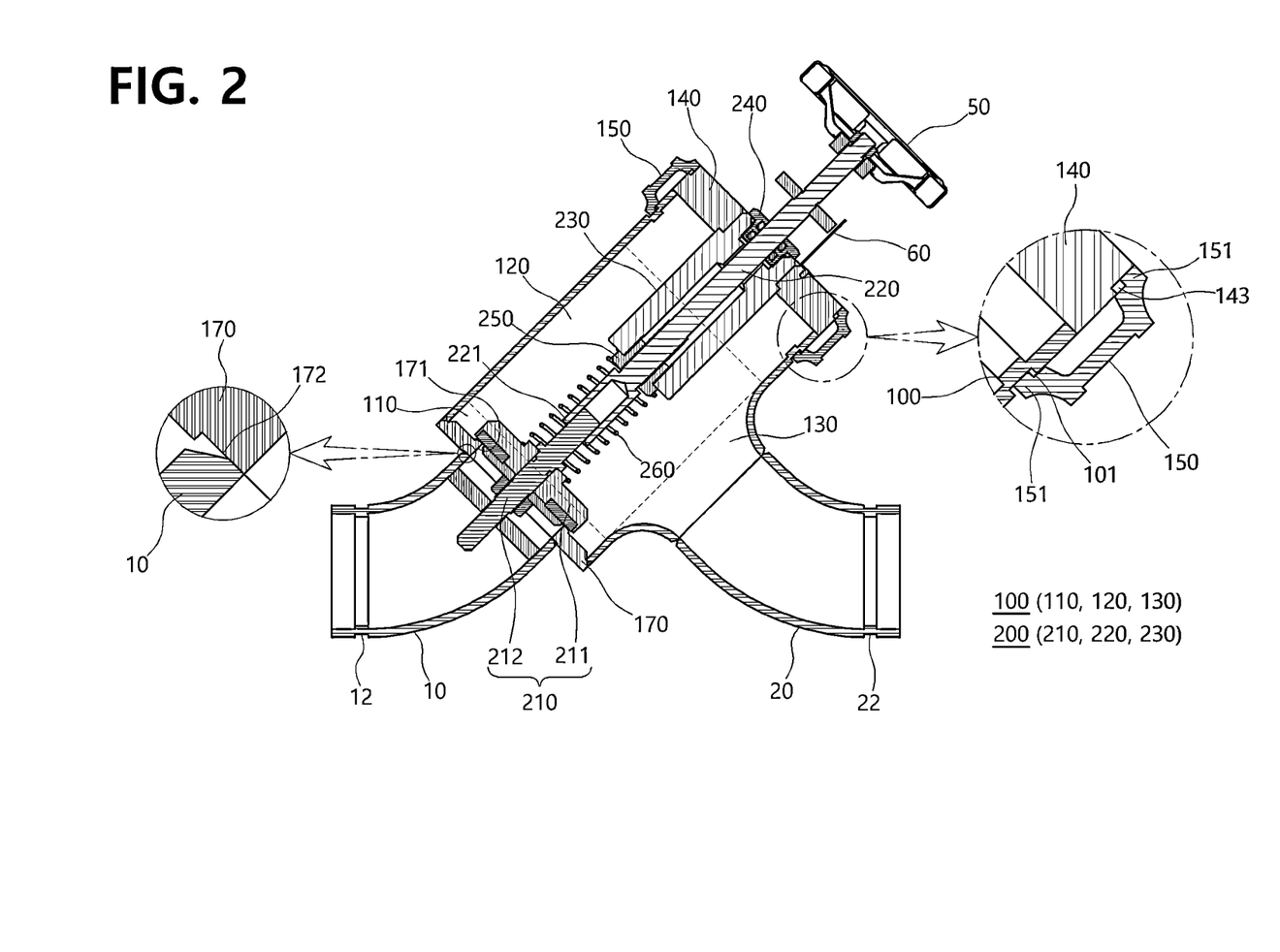
FIG. 2 is a view illustrating a state in which a flow path is closed.
Figure 3:
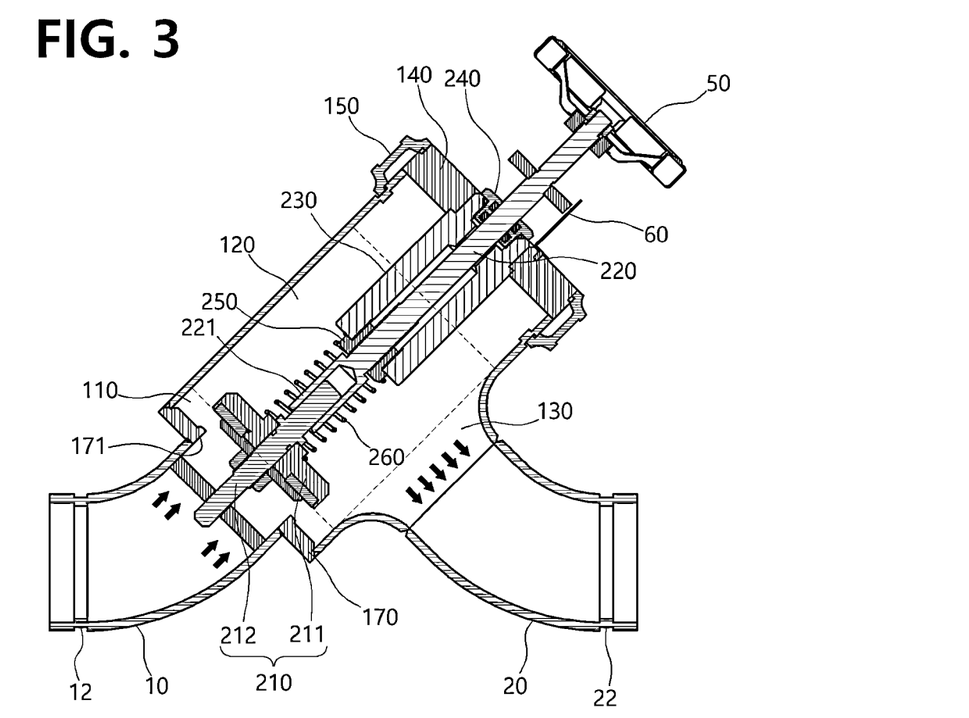
FIG. 3 is a view illustrating a state in which the flow path is opened.
Figure 4:
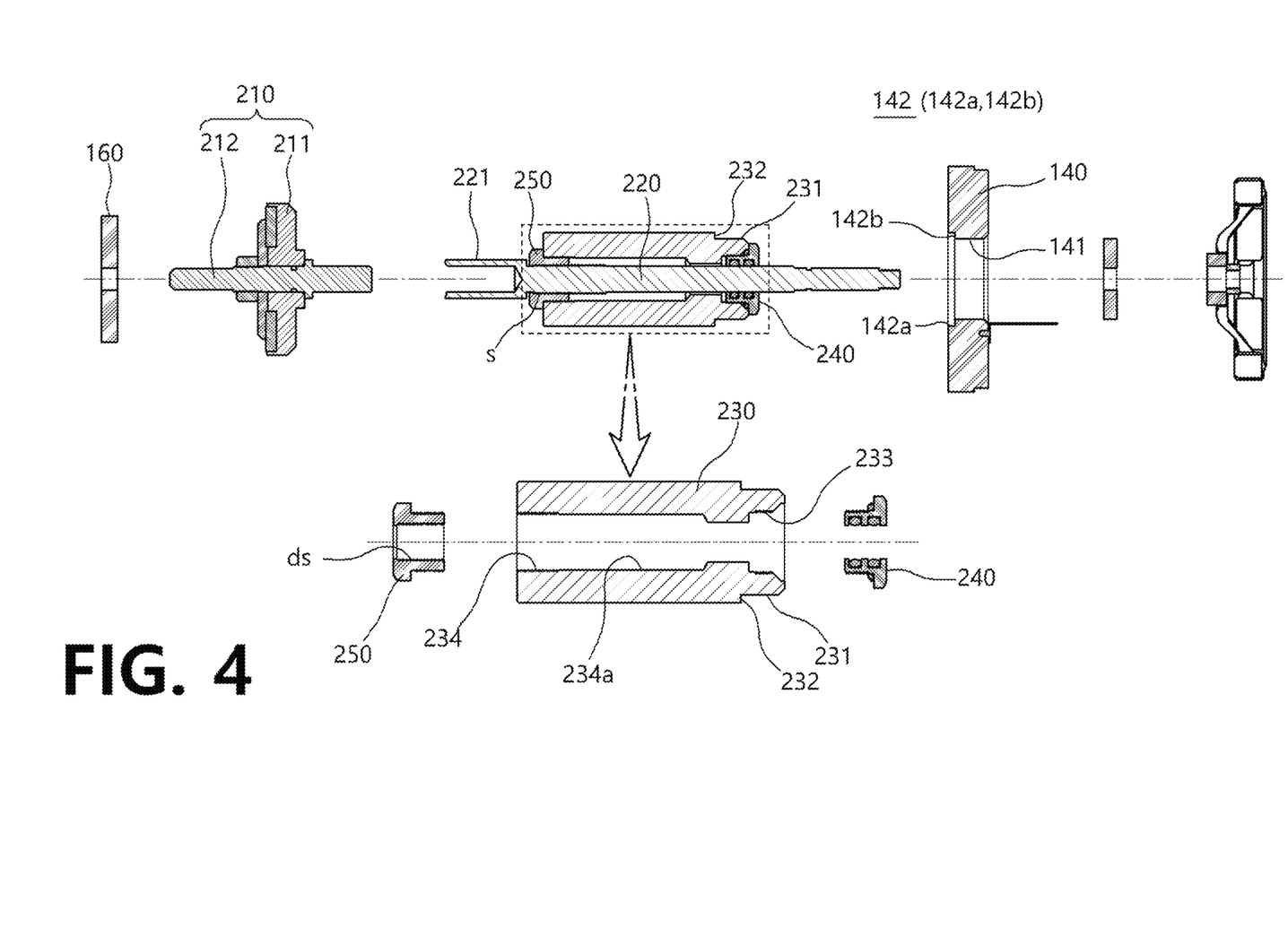
FIG. 4 is an exploded cross-sectional view illustrating an opening/closing part according to the present invention.
Figure 5:
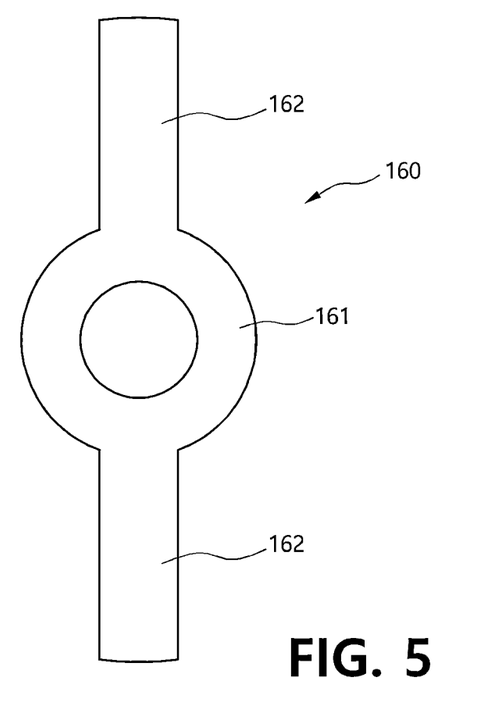
FIG. 5 is a plan view illustrating an in-guide according to the present invention.
Figure 6:
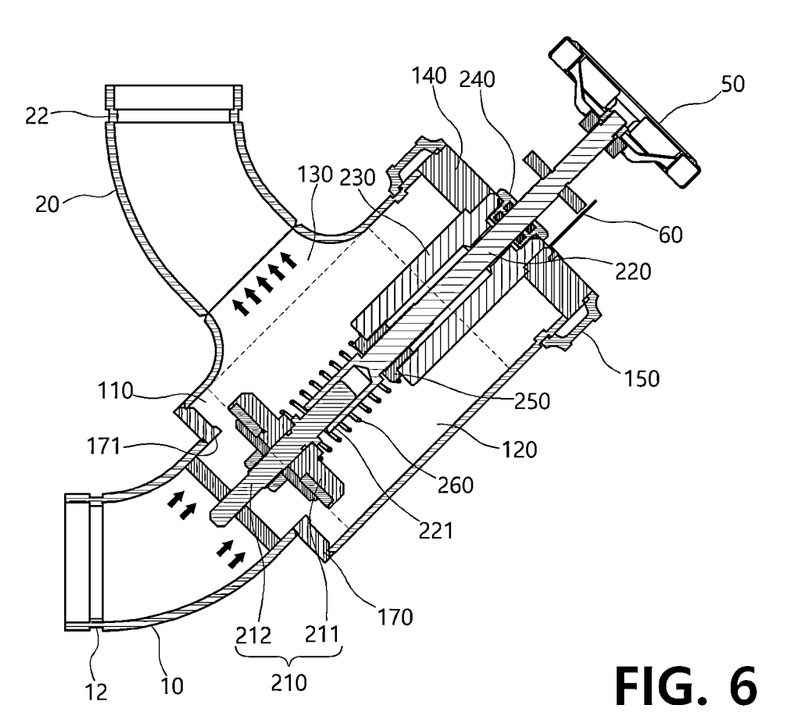
FIG. 6 is a cross-sectional view illustrating a check valve according to another embodiment of the present invention.
Figure 7:
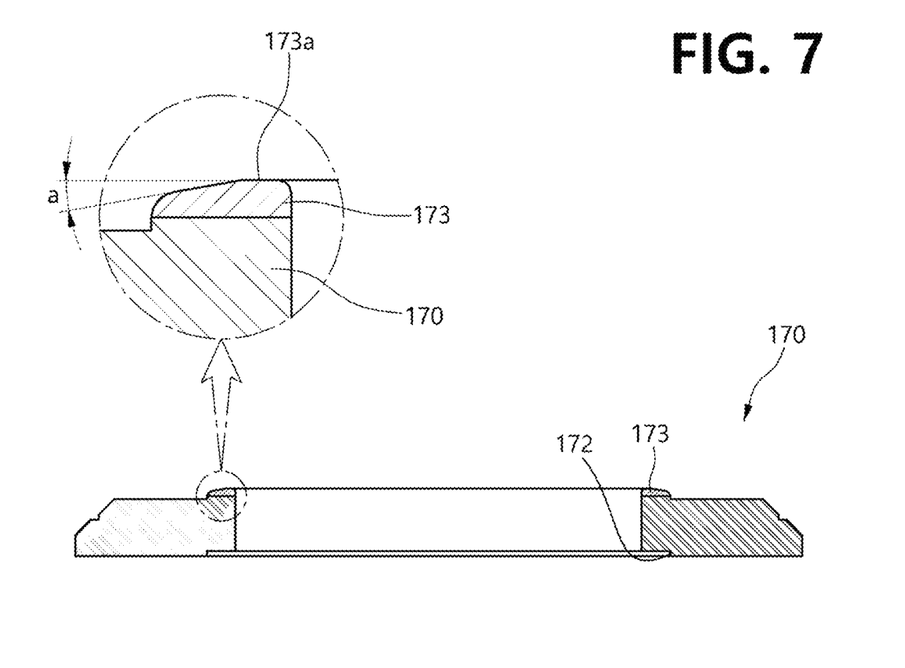
FIG. 7 is a cross-sectional view illustrating an in-plate according to the present invention.
Figure 8:
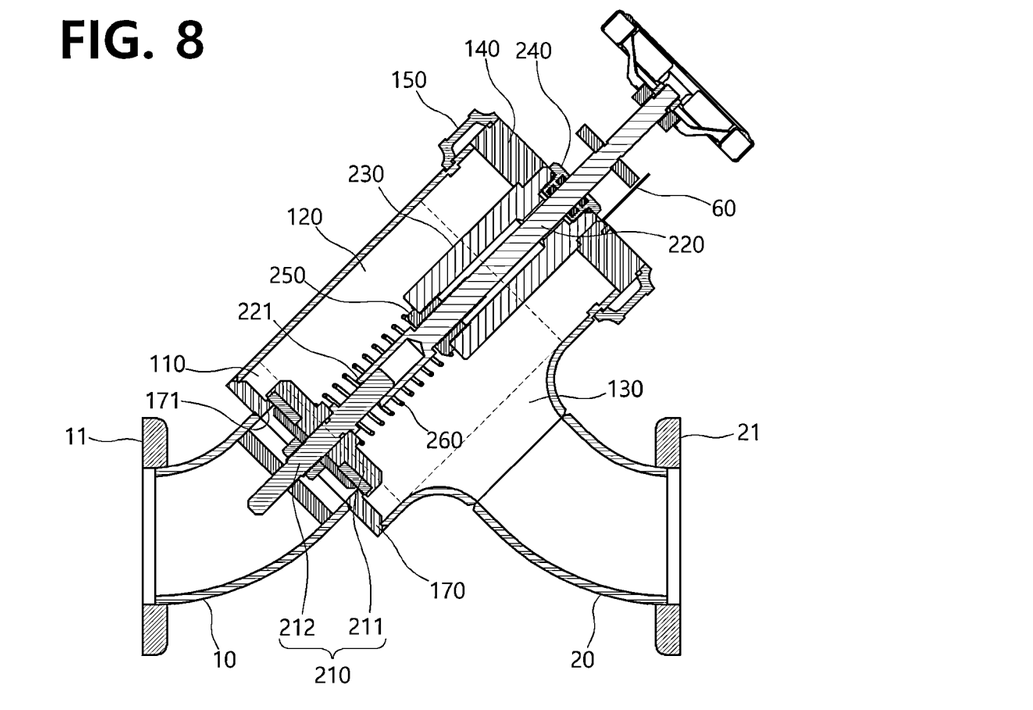
FIGS. 8 and 9 are cross-sectional views illustrating a check valve according to still another embodiment of the present invention.
Figure 9:
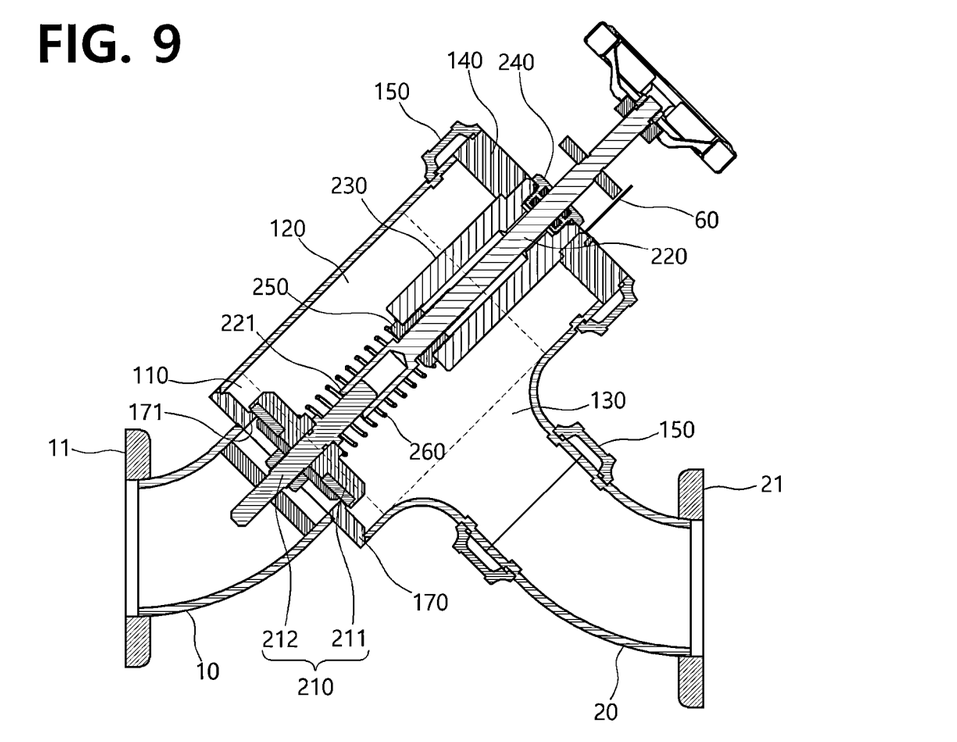

FIG. 1 is a perspective view illustrating a check valve according to an embodiment of the present invention, FIGS. 2 and 3 are cross-sectional views illustrating the check valve according to the present invention, wherein FIG. 2 is a view illustrating a state in which a flow path is closed, and FIG. 3 is a view illustrating a state in which the flow path is opened, FIG. 4 is an exploded cross-sectional view illustrating an opening/closing part according to the present invention, FIG. 5 is a plan view illustrating an in-guide according to the present invention, FIG. 6 is a cross-sectional view illustrating a check valve according to another embodiment of the present invention, FIG. 7 is a cross-sectional view illustrating an in-plate according to the present invention, and FIGS. 8 and 9 are cross-sectional views illustrating a check valve according to still another embodiment of the present invention.

As illustrated in FIG. 1, a check valve 30 according to the present invention, which is a check valve 30 installed between an inlet pipe 10 and an outlet pipe 20 through which a fluid flows, includes a body part 100 through which a fluid is introduced or discharged and an opening/closing part 200 that opens or closes a path of the fluid introduced into the body part 100.

The body part 100 is provided with a cap 140 that opens the inside of the body part 100 so that the opening/closing part 200 may be retracted or extracted. As illustrated in FIG. 1, the cap 140 may be fastened to the body part 100 using a coupler 150, and a fastening structure of the cap 140 and the body part 100 through the coupler 150 will be described below.

Further, the opening/closing part 200 is provided with a handle 50 for adjusting the degree of opening of the path of the fluid, and the body part 100 is provided with an indicator 60 through which an operator visually identifies the degree of opening.

In addition, a bypass pipe 40 is provided so that the fluid introduced through the inlet pipe 10 directly moves to the outlet pipe 20 without passing through the body part 100.

As illustrated in FIGS. 2 and 3, the body part 100 includes an inlet region 110 which is connected to the inlet pipe 10 and into which the fluid is introduced, a retention region 120 in which the fluid supplied to the inside of the body part 100 through the inlet region 110 is retained, and a discharge region 130 which is connected to the outlet pipe 20 and through which the fluid in the retention region 120 is discharged to the outside of the body part 100.

Thus, the fluid flowing to the inlet pipe 10 is introduced into the body part 100 through the inlet region 110 and is discharged to the outside of the body part 100 through the discharge region 130 via the retention region 120. In this case, the fluid discharged to the discharge region 130 flows along the outlet pipe 20.

The opening/closing part 200 that opens or closes the path of the fluid introduced through the inlet pipe 10 is included in the body part 100, and the opening/closing part 200 includes a disc assembly 210 that opens or closes the path of the fluid introduced through the inlet pipe 10, a stem 220 that provides a movement path of the disc assembly 210, and a first guide 230 that supports one side of the stem 220.

That is, the disc assembly 210 may open or close the path of the fluid while sliding along the stem 220, and the first guide 230 may stably support the stem 220, thereby reliably performing the opening/closing operation.

Further, as illustrated in FIG. 4, the body part 100 is provided with the cap 140 that opens the inside of the body part 100 so that the opening/closing part 200 may be retracted or extracted, and the first guide 230 has a first coupling surface 231 fixedly inserted into an inner circumferential surface of a through-hole 141 formed in the cap 140.

That is, the first coupling surface 231 is formed so that the first guide 230 that supports one side of the stem 220 of the opening/closing part 200 is fixedly inserted into the cap 140. Thus, the cap 140 provided in the body part 100 and the opening/closing part 200 that opens or closes the flow path are configured as a separated type and are then assembled separately. Thus, the overall volume of the cap 140 may be reduced, thereby facilitating handling and improving workability.

In this case, the body part 100 may have an integrated structure in which a region, in which the opening/closing part 200 is installed, is disposed in a straight line through the inlet region 110, the retention region 120, and the cap 140. This is because the length of the stem 220 exposed to the outside of the body part 100 may be configured to be short as the stem 220 is disposed in the inlet region 110 and the retention region 120 arranged in a straight line, and thus the overall compact check valve 30 may be formed.

At least one of the body part 100 and the cap 140 may be formed as a pipe made of steel or stainless steel, and thus the volume and the weight can be reduced and the durability can be increased.

In addition, as illustrated in FIG. 4, a stepped surface 142 extending radially outward is formed on the inner circumferential surface of the through-hole 141, and a second coupling surface 232 fixedly inserted into the stepped surface 142 is formed on the first guide 230.

That is, in order to enable a stable opening/closing operation of the flow path through the opening/closing part 200, the opening/closing part 200 needs to be accurately fixed to the cap 140. To this end, as described above, the stepped surface 142 extending radially outward is formed on the inner circumferential surface of the through-hole 141 formed in the cap 140, and the second coupling surface 232 fixedly inserted into the stepped surface 142 is formed on the first guide 230. In this case, the stepped surface 142 is formed with a first surface 142a extending axially and a second surface 142b extending radially outward.

In this case, as illustrated in FIG. 4, a first coupling groove 233 recessed in an axial direction of the stem 220 may be formed in one side of the first guide 230, and a first bush 240 that simultaneously supports an inner circumferential surface of the first guide 230 and an outer circumferential surface of the stem 220 may be inserted into the first coupling groove 233.

That is, after the first bush 240 is first fixedly inserted into the first coupling groove 233 recessed in one side of the first guide 230, the stem 220 is installed to pass through the first bush 240, and thus the first bush 240 supports the stem 220.

In order to install the first bush 240 in the first guide 230, mutually corresponding screw structures may be formed in the inner circumferential surface of the first guide 230 and an outer circumferential surface of the first bush 240.

Further, in order to prevent the fluid from leaking between the outer circumferential surface of the stem 220 and an inner circumferential surface of the first bush 240 in a state in which the stem 220 passes through the first bush 240, a separate O-ring may be provided in the first bush 240.

In this case, a second coupling groove 234 recessed in the axial direction of the stem 220 may be formed in the other side of the first guide 230, and a second bush 250 that simultaneously supports the inner circumferential surface of the first guide 230 and the outer circumferential surface of the stem 220 may be inserted into the second coupling groove 234.

That is, like the first bush 240, after the second bush 250 is first fixedly inserted into the second coupling groove 234 recessed in the other side of the first guide 230, the stem 220 is installed to pass through the second bush 250, and thus the second bush 250 supports the stem 220.

As described above, in order to install the second bush 250 in the first guide 230, mutually corresponding screw structures may be formed in the inner circumferential surface of the first guide 230 and an outer circumferential surface of the second bush 250.

In this case, as illustrated in FIG. 4, a thread s may be formed in the outer circumferential surface of the stem 220, and a corresponding thread ds corresponding to the thread s may be formed in an inner circumferential surface of the second bush 250.

That is, when a user turns the handle 50, the stem 220 is rotated, and the thread s is moved in an axial direction along the corresponding thread ds formed in the second bush 250.

In this way, since the first bush 240 and the second bush 250 are provided in the first guide 230, the stem 220 may be stably supported. As a result, the disc assembly 210 may be stably supported, and thus the opening/closing operation can be reliably performed.

Further, as illustrated in FIG. 4, the second coupling groove 234 may be formed with a separation surface 234a mutually spaced apart from the outer circumferential surface of the stem 220.

The separation surface 234a may be formed between the first bush 240 and the second bush 250. When the separation surface 234a is formed in this way, the stem 220 is supported only by the first bush 240 and the second bush and is not in direct contact with the inner circumferential surface of the first guide 230. Thus, when the user rotates the stem 220 using the handle 50, the stem 220 may be smoothly rotated even with a small force.

In this case, as illustrated in FIGS. 2 to 4, the disc assembly 210 may include a disc 211 that allows the flowing fluid to be introduced or blocked and a disc stem 212 that is disposed at a center of the disc 211 and is coupled to the stem 220.

That is, when the fluid introduced through the inlet pipe 10 applies a pressure to the disc 211, the disc 211 and the disc stem 212 assembled thereto are pushed, and the disc stem 212 is moved in the axial direction of the stem 220 in a state of being coupled to the stem 220.

In this case, the opening/closing part 200 is provided with a spring 260 that is installed in a circumference of the stem 220 and provides an elastic restoring force to shield the fluid introduced through the inlet pipe 10.

In this case, a second guide 221 into which the disc stem 212 is inserted may be provided on the other side of the stem 220, and the outer circumferential surface of the disc stem 212 may slide in an axial direction while being supported by an inner circumferential surface of the second guide 221.

That is, when the disc 211 is pushed by the fluid introduced through the inlet pipe 10, the disc stem 212 is moved together. In this case, the disc stem 212 is pushed while moving in the axial direction along the inner circumferential surface of the second guide 221 provided on the other side of the stem 220. In this way, when the outer circumferential surface of the disc stem 212 is supported by the inner circumferential surface of the second guide 221, the disc 211 opens or closes the flow path while stably moving in the axial direction of the stem 220.

In this case, fastening grooves 101 and 143 may be formed radially inward along a circumference in outer circumferential surfaces of the body part 100 and the cap 140, and the check valve 30 may further include the coupler 150 having a pair of legs 151 extending radially inward so that the legs 151 are inserted into the pair of fastening grooves 101 and 143 facing each other.

The coupler 150 is obtained by assembling two or more coupling segments and may be configured by two, three, or four coupling segments according to the size thereof.

As described above, when the body part 100 and the cap 140 are formed of steel or stainless steel, the fastening grooves 101 and 143 are formed in a circumferential direction through machining, and when fastening is performed using the coupler 150, the ease of fastening and stability can be secured.

The body part 100 may be formed as a seamless pipe or a welded steel pipe.

First, the seamless pipe is made by punching a hole in a material and then processing or extruding an already perforated material with a press. Representative methods include a rolling piercing method, a centrifugal casting method, an extrusion method, a drawing method, and the like. The seamless pipe is mainly used for special pipes, machine structures, and heat exchangers having high pressure resistance, high temperature resistance, low temperature resistance, corrosion resistance, and the like, which cannot be used as the welded steel pipes.

Further, the welded steel pipe is made by bending an iron plate and welding a joint and is classified into an electric resistance welded steel pipe (ERW steel pipe), a gas welded pipe, and an arc welding steel pipe (SAW steel pipe) according to welding manners. The welded steel pipe may be classified into a carbon steel pipe, a stainless steel pipe, a galvanized steel pipe, and the like according to the properties of raw materials.

When the body part 100 is configured in this way, the fastening groove 101 is formed through machining and connection is achieved in a ring joint manner or a groove joint manner or the inlet pipe 10 and the outlet pipe 20 may be connected in a welding manner. Thus, the volume and the weight can be reduced, and the durability can be increased.

In this case, an in guide 160 that supports the other side of the disc stem 212 may be provided in an inner circumferential surface of the inlet pipe 10.

That is, as described above, one side of the disc stem 212 is supported by the second guide 221 provided in the stem 220 and the other side of the disc stem 212 is supported by the in guide 160. As a result, the disc stem 212 can be stably supported and opened or closed.

The in guide 160 may be fixed to the inner circumferential surface of the inlet pipe 10 in a welding manner.

In this case, as illustrated in FIG. 5, the in guide 160 may have a support ring 161 through which the other side of the disc stem 212 is supported to pass and a support bar 162 extending radially outward from the support ring 161 to be in contact with the inner circumferential surface of the inlet pipe 10.

In this way, when the in guide 160 provided in the inlet pipe 10 to support the other side of the disc stem 212 has the support ring 161 and the support bar 162, the flow rate of the fluid being introduced can be increased and smooth flow can be achieved.

In this case, an in plate 170 having an inlet hole 171 through which the fluid introduced the inlet pipe 10 flows is provided at an end of the inlet region 110, and the in plate 170 may have an insertion groove 172 into which a circumference of the inlet pipe 10 is inserted by a predetermined length in the axial direction.

As described above, when the body part 100 is formed of steel or stainless steel, the in plate 170 may be fixed to the body part 100 in a welding manner. Further, according to an angle between the inlet pipe 10 and the outlet pipe 20 fixedly welded to the body part 100 and the in plate 170, as illustrated in FIG. 3, a horizontal check valve 30 may be configured, or as illustrated in FIG. 6, an angle check valve 30 may be configured.

In addition, the insertion groove 172 may be formed in the circumference of the inlet hole 171 formed in the in plate 170, the circumference of the inlet pipe 10 may be inserted by a predetermined length in the axial direction, and thus the inlet hole 171 may be fixedly disposed at an accurate location.

In this case, as illustrated in FIG. 7, a reinforcement rib 173 extending axially toward the disc assembly 210 may be provided in a circumference of the inlet hole 171, a seating surface 173a on which the disc assembly 210 is seated may be formed in the reinforcement rib, and the seating surface 173a may have a downward inclination a in a direction away from the disc assembly 210.

The reinforcement rib 173 may be made of stainless steel and may be directly welded at a location on one side of the in plate 170, in which the disc assembly 210 is seated. It is preferable that the reinforcement rib 173 is hardface-welded (built-up-welded) using a corrosion-resistant welding rod to prevent corrosion, and as a result, the corrosion resistance or hardness (increasing wear resistance in preparation for frequent operations of the disc assembly 210) of the reinforcement rib 173 can be increased.

In addition, a downward inclination is formed on the seating surface 173a formed in the reinforcement rib 173. This is for effectively closing the flow path of the fluid by increasing a contact area between the disc assembly 210 and the seating surface 173a as the elastic restoring force of the spring increases.

In this case, as illustrated in FIGS. 1 to 3, locking grooves 12 and 22 extending radially inward along the circumferences of the inlet pipe 10 and the outlet pipe 20 may be formed in the inlet pipe 10 and the outlet pipe 20.

Alternatively, as illustrated in FIG. 8, flanges 11 and 21 extending radially outward along the circumferences of the inlet pipe 10 and the outlet pipe 20 may be formed in the inlet pipe 10 and the outlet pipe 20.

In addition, as illustrated in FIG. 9, the fastening grooves 101 extending radially inward along the circumference may be formed in an outer circumferential surface of the discharge region 130 and an outer circumferential surface of the outlet pipe 20 formed in the body part 100, and the check valve 30 may further include the coupler 150 having the pair of legs 151 extending radially inward so that the legs 151 are inserted into the pair of fastening grooves 101 facing each other.

The coupler 150 is obtained by assembling two or more coupling segments and may be configured as two, three, or fourth coupling segments according to the size thereof.

To this end, it is preferable that the body part 100, the inlet pipe 10, and the outlet pipe 20 are formed of steel or stainless steel. In this configuration, as compared to a valve body made of cast iron according to the related art, tensile strength and water pressure resistance are increased, and thus the valve body is not easily broken or deformed in use. Further, the body part 100, the inlet pipe 10, and the outlet pipe 20 may be connected in a simpler manner such as a welding manner, a ring joint manner, and a groove joint manner. Thus, the workability can be improved and, and manufacturing costs can be reduced by reducing an installation period.

Although the embodiments of the present invention have been described, the spirit of the present invention is not limited to the embodiments presented in the present specification. Those skilled in the art who understand the spirit of the present invention could easily propose other embodiments by adding, changing, deleting, adding, or the like of components within the same scope of the spirit. Further, these other embodiments also belong to the scope of the spirit of the present invention.

The invention claimed is:

1. An check valve installed between an inlet pipe and an outlet pipe through which a fluid flows, the check valve comprising:
   a body part that has an inlet region which is connected to the inlet pipe and through which the fluid is introduced, a retention region in which the fluid supplied to an inside of the body part through the inlet region is retained, and a discharge region which is connected to the outlet pipe and through which the fluid in the retention region is discharged to an outside of the body part; and
   an opening/closing part that has a disc assembly which is provided inside the body part and opens or closes a path of the fluid introduced through the inlet pipe, a stem which provides a movement path of the disc assembly, and a first guide that supports one side of the stem,
   wherein the body part has a cap that opens the inside of the body part so that the opening/closing part is retracted or extracted,
   a first coupling surface fixedly inserted into an inner circumferential surface of a through-hole formed in the cap is formed in the first guide,
   an in plate having an inlet hole through which the fluid introduced through the inlet pipe flows is formed at an end of the inlet region,
   an insertion groove into which a circumference of the inlet pipe is inserted by a predetermined length in an axial direction is formed in the in plate,
   a reinforcement rib, which extends axially toward the disc assembly and is fixed to the circumference of the inlet hole in a hardface-welding manner using a corrosion-resistant welding rod, is provided at a circumference of the inlet hole, and
   a seating surface, on which the disc assembly is seated, is formed in the reinforcement rib, and a downward inclination is formed on the seating surface in a direction away from the disc assembly so that a contact area between the disc assembly and the seating surface increases as an elastic restoring force of a spring increases.

2. The check valve of claim 1, wherein locking grooves extending radially inward along circumferences of the inlet pipe and the outlet pipe are formed in the inlet pipe and the outlet pipe.

3. The check valve of claim 1, wherein flanges extending radially outward along circumferences of the inlet pipe and the outlet pipe are formed in the inlet pipe and the outlet pipe.

4. The check valve of claim 1, wherein a pair of fastening grooves are formed radially inward along circumferences in an outer circumferential surface of the discharge region and an outer circumferential surface of the outlet pipe formed in the body part, and the check valve further comprises a coupler having a pair of legs extending radially inward so that the legs are inserted into the pair of fastening grooves facing each other.

5. The check valve of claim 1, wherein the disc assembly includes a disc that allows a flowing fluid to be introduced or blocked and a disc stem disposed in a center of the disc and coupled to the stem, a second guide into which the disc stem is inserted is provided on the other side of the stem, an outer circumferential surface of the disc stem slides in an axial direction while being supported by an inner circumferential surface of the second guide, an in guide that supports the other side of the disc stem is provided in an inner circumferential surface of the inlet pipe, and the in guide has a support ring through which the other side of the disc stem is supported to pass and a support bar extending radially outward from the support ring and fixed to the inner circumferential surface of the inlet pipe in a welding manner.

6. The check valve of claim 1, wherein a first coupling groove recessed in an axial direction of the stem is formed in one side of the first guide, and a first bush that simultaneously supports an inner circumferential surface of the first guide and an outer circumferential surface of the stem is inserted into the first coupling groove.

7. The check valve of claim 6, wherein a second coupling groove recessed in the axial direction of the stem is formed in the other side of the first guide, and a second bush that simultaneously supports the inner circumferential surface of the first guide and the outer circumferential surface of the stem is inserted into the second coupling groove.

8. The check valve of claim 7, wherein a separation surface spaced apart from the outer circumferential surface of the stem is formed in the second coupling groove.

9. The check valve of claim 1, wherein a pair of fastening grooves are formed radially inward along circumferences in outer circumferential surfaces of the body part and the cap, and the check valve further comprises a coupler having a pair of legs extending radially inward so that the legs are inserted into the pair of fastening grooves facing each other.

* * * * *